United States Patent
Yamada et al.

(10) Patent No.: US 10,901,139 B2
(45) Date of Patent: Jan. 26, 2021

(54) IMAGE DISPLAY DEVICE

(71) Applicant: FUJIFILM Corporation, Tokyo (JP)

(72) Inventors: Naoyoshi Yamada, Kanagawa (JP); Yukito Saitoh, Kanagawa (JP); Hiroshi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/744,349

(22) Filed: Jan. 16, 2020

(65) Prior Publication Data

US 2020/0150334 A1    May 14, 2020

Related U.S. Application Data

(63) Continuation of application No. PCT/JP2018/027150, filed on Jul. 19, 2018.

(30) Foreign Application Priority Data

Jul. 20, 2017 (JP) .................. 2017-141221
Aug. 10, 2017 (JP) .................. 2017-155463
Jul. 9, 2018 (JP) .................. 2018-130281

(51) Int. Cl.
*G02F 1/1333* (2006.01)
*F21V 8/00* (2006.01)
*G02B 5/30* (2006.01)

(52) U.S. Cl.
CPC .......... *G02B 6/0056* (2013.01); *G02B 5/3016* (2013.01); *G02B 6/0055* (2013.01); *G02F 1/13336* (2013.01)

(58) Field of Classification Search
CPC .................................. G02F 1/13336
See application file for complete search history.

(56) References Cited

U.S. PATENT DOCUMENTS 8,482,691 B2    7/2013  Park et al.
2006/0244923 A1  11/2006  Mitani et al.
(Continued)

FOREIGN PATENT DOCUMENTS

JP          6-88959 A      3/1994
JP       2006-308707 A    11/2006
(Continued)

OTHER PUBLICATIONS

International Preliminary Report on Patentability and Written Opinion of the International Searching Authority, dated Jan. 30, 2020, for International Application No. PCT/JP2018/027150, with an English translation of the Written Opinion of the International Searching Authority.
(Continued)

*Primary Examiner* — Edmond C Lau
(74) *Attorney, Agent, or Firm* — Birch, Stewart, Kolasch & Birch, LLP

(57) ABSTRACT

Provided is an image display device including an image display unit which includes a display area in which a plurality of pixels is arranged, and a non-display area provided at a periphery of the display area, a light guide unit which has one surface disposed so as to face at least an edge of the display area of the image display unit on a viewing side and another surface that is disposed at an opposite side of the light guide from the one surface and is provided at a position shifted further toward the non-display area than the one surface, and a diffraction element which is disposed between the image display unit and the light guide unit and diffracts light from the display area toward the side of the non-display area adjacent to the edge.

14 Claims, 7 Drawing Sheets

(56) References Cited

U.S. PATENT DOCUMENTS

| | | |
|---|---|---|
| 2010/0246104 A1 | 9/2010 | Park et al. |
| 2011/0255301 A1 | 10/2011 | Watanabe |
| 2011/0310488 A1 | 12/2011 | Tomotoshi et al. |
| 2012/0069273 A1 | 3/2012 | Watanabe |
| 2013/0016299 A1 | 1/2013 | Takama et al. |
| 2013/0050613 A1 | 2/2013 | Ohshima |
| 2013/0242555 A1 | 9/2013 | Mukawa et al. |
| 2014/0043683 A1* | 2/2014 | Jo .................... G02F 1/133528 359/483.01 |
| 2015/0261046 A1 | 9/2015 | Miki et al. |
| 2016/0231568 A1 | 8/2016 | Saarikko et al. |
| 2016/0320536 A1 | 11/2016 | Simmonds et al. |
| 2017/0094814 A1* | 3/2017 | Chin ..................... G02B 6/00 |

FOREIGN PATENT DOCUMENTS

| | | |
|---|---|---|
| JP | 2007-294336 A | 11/2007 |
| JP | 2013-20181 A | 1/2013 |
| JP | 2013-44899 A | 3/2013 |
| JP | 2013-190658 A | 9/2013 |
| JP | 2015-99375 A | 5/2015 |
| JP | 2015-172661 A | 10/2015 |
| JP | 2017-504063 A | 2/2017 |
| WO | WO 2010/055671 A1 | 5/2010 |
| WO | WO 2010/092794 A1 | 8/2010 |
| WO | WO 2010/140537 A1 | 12/2010 |

OTHER PUBLICATIONS

International Search Report, dated Oct. 2, 2018, for International Application No. PCT/JP2018/027150, with an English translation.
Lee et al., "Development of Zero-bezel Display Utilizing a Waveguide Image Transformation Element," SID 2017 Digest, 2017. pp. 612-614.
Foreign Office Action of Japanese Patent Application No. 2019-530598 dated Sep. 15, 2020 with English translation.

* cited by examiner

IMAGE DISPLAY DEVICE

CROSS-REFERENCE TO RELATED APPLICATIONS

This application is a continuation application of International Application No. PCT/JP2018/027150, filed Jul. 19, 2018, the disclosure of which is incorporated herein by reference in its entirety. Further, this application claims priority from Japanese Patent Application No. 2017-141221, filed Jul. 20, 2017, Japanese Patent Application No. 2017-155463, filed Aug. 10, 2017, and Japanese Patent Application No. 2018-130281, filed Jul. 9, 2018, the disclosures of which are incorporated herein by reference in their entirety.

BACKGROUND OF THE INVENTION

1. Field of the Invention

The present disclosure relates to an image display device.

2. Description of the Related Art

Image display devices such as liquid crystal display devices and organic electroluminescence (EL) display devices are installed in various electronic devices such as televisions, monitors, smartphones, game machines, and digital signage devices. An image display unit in an image display device typically has a display area and a non-display area provided in the periphery thereof. The non-display area is also referred to as a frame or a bezel and is provided to store a backlight unit or hide a wire and the like disposed in the periphery of a display panel or a touch panel.

However, in a case where the area of a non-display area in an image display device increases, the area of an image display unit increases. Therefore, the designability may be degraded. Further, an increase in area of the non-display area may result in an increase in size of the image display device, and this may be a problem particularly in small devices such as smartphones. Further, in a digital signage device that displays one image by arranging a plurality of image display devices in parallel, there is a problem in that the image is divided by a non-display area.

For these reasons, there is a demand for a narrow frame image display device formed by reducing the area of a non-display area.

For example, U.S. Pat. No. 8,482,691B (hereinafter, also referred to as Patent Document 1), JP2015-099375A (hereinafter, also referred to as Patent Document 2), and WO2010/140537A (hereinafter, also referred to as Patent Document 3) each suggest a narrow frame image display device which shows a non-display area to be smaller or shows an image by enlarging the image by means of disposing a lens on a viewing side of an image display unit and refracting light beams emitted from a display area.

Further, JP1994-088959A (JP-H06-088959A, hereinafter, also referred to as Patent Document 4) suggests a liquid crystal display device in which a light guide plate comprising a light guide unit that guides light for each pixel of an image display unit to the surface is disposed on a viewing side of a liquid crystal display unit and which has a shape in which the light guide unit of the light guide plate is enlarged toward the surface. With this configuration, the frame thereof is attempted to be narrowed. Further, JP2013-044899A (hereinafter, also referred to as Patent Document 5) suggests a liquid crystal display device which comprises a flat plate-like optical element enlarging an original image on a viewing side of a liquid crystal panel to form a display image on the front surface thereof, which is an optical panel that allows unit parallel light beams for each pixel to be skewed by refraction so that the position in the flat plate surface is shifted and allows the light beams to be emitted from a pixel projection section corresponding to the pixel in an image display area where a display image is formed.

Further, SID 2017 DIGEST, 612 (2017) (written by Sejin Lee, Jeongmin Moon, SeungSoo Yang, Jusang Rhim, Bora Kim, YongSeok Lee, SeungJun Han, SooYoung Yoon, and InByeong Kang) (hereinafter, also referred to as Non-Patent Document 1) suggests a narrow frame image display device in which fiber optics (also referred to as fiber plates) formed by bundling a plurality of optical fibers are provided on a viewing side of an image display unit, and light beams emitted from a display area are guided to a non-display area so that the non-display area is not visually recognized.

SUMMARY OF THE INVENTION

According to the examination conducted by the present inventors, the narrow frame image display device described in each of Patent Documents 1 to 3 has a problem in that a part of an image is seen to be distorted due to the refraction effect of the lens or the thickness of the image display device is increased due to the thickness of the lens.

Similarly, the image display device described in each of Patent Documents 4 and 5 and Non-Patent Document 1 has a problem in that the total thickness of the image display device is increased due to the thickness of the light guide unit such as the optical panel and the fiber optics.

In a case where the thickness of the light guide unit is decreased, the light guide efficiency of light beams incident on the light guide unit after being emitted from the display area decreases, the brightness of the image display decreases, and light beams from adjacent pixels are mixed to cause crosstalk. Therefore, it is not possible to reduce the thickness of the image display device.

The present invention has been made in consideration of the above-described problems, and an object to be achieved by the present invention is to provide a frame-narrowed image display device which is capable of displaying a high-resolution image while suppressing an increase in thickness accompanied by narrowing the frame.

In other words, the object is achieved by the present invention with the following configuration.

<1> An image display device comprising: an image display unit which includes a display area in which a plurality of pixels is arranged, and a non-display area provided at a periphery of the display area; a light guide unit which has one surface disposed so as to face at least an edge of the display area of the image display unit on a viewing side and another surface that is disposed at an opposite side of the light guide from the one surface and is provided at a position shifted further toward the non-display area than the one surface; and a diffraction element which is disposed between the image display unit and the light guide unit and diffracts light from the display area toward a side of the non-display area adjacent to the edge.

<2> The image display device according to <1>, in which the diffraction element is a polarization diffraction grating which includes a liquid crystal layer containing aligned liquid crystal molecules.

<3> The image display device according to <1> or <2>, in which the image display unit emits circularly polarized light.

<4> The image display device according to any one of <1> to <3>, further comprising: a phase difference plate which is disposed between the image display unit and the diffraction element and converts light emitted from the image display unit into circularly polarized light.

<5> The image display device according to any one of <1> to <4>, further comprising: a reflective polarizer provided between the image display unit and the light guide unit.

<6> The image display device according to any one of <1> to <5>, in which the light guide unit includes a plurality of light guide areas and a boundary that separates the respective light guide areas.

<7> The image display device according to <6>, in which the boundary includes a low-refractive index layer, an air layer, a reflective layer, or a dielectric multilayer film, and at least some of light beams incident on the light guide areas are guided while repeating total reflection at an interface with the boundary.

<8> The image display device according to <6> or <7>, in which the boundary includes a light absorption layer, and at least some of light beams incident on the boundary from the light guide areas are absorbed by the light absorption layer.

<9> The image display device according to any one of <6> to <8>, in which an area of the light guide areas at a side of the other surface is larger than or equal to an area of the light guide areas at a side of the one surface.

<10> The image display device according to any one of <6> to <9>, in which an area of the light guide areas at a side of the one surface is less than or equal to an area of the pixels.

<11> The image display device according to any one of <1> to <10>, further comprising: a refractive element provided at the other surface of the light guide unit.

<12> The image display device according to any one of <1> to <11>, further comprising: a light scattering unit provided at the other surface of the light guide unit.

<13> The image display device according to any one of <1> to <12>, further comprising: a circular polarizer provided at the other surface of the light guide unit.

<14> The image display device according to any one of <1> to <13>, in which the image display unit comprises a liquid crystal display device, an organic electroluminescence (EL) display device, a light emitting diode (LED) display device, or a micro-electromechanical system (MEMS) shutter display device.

According to the present invention, it is possible to provide a frame-narrowed image display device which is capable of displaying a high-resolution image while suppressing an increase in thickness accompanied by narrowing the frame.

DESCRIPTION OF THE PREFERRED EMBODIMENTS

Hereinafter, the present invention will be described in detail with reference to the accompanying drawings. The following constituent elements will be described based on representative embodiments and specific examples, but the present invention is not limited to such embodiments.

First, in regard to a frame-narrowed image display device of the related art obtained by using fiber optics, which is described in Non-Patent Document 1, the mechanism for realizing a narrowed frame and the reason why it is difficult to reduce the thickness of fiber optics will be described. Next, the mechanism of an image display device according to an embodiment of the present invention will be described in order to clarify a difference between the image display devices.

[Image Display Device of Related Art]

Figure 1:
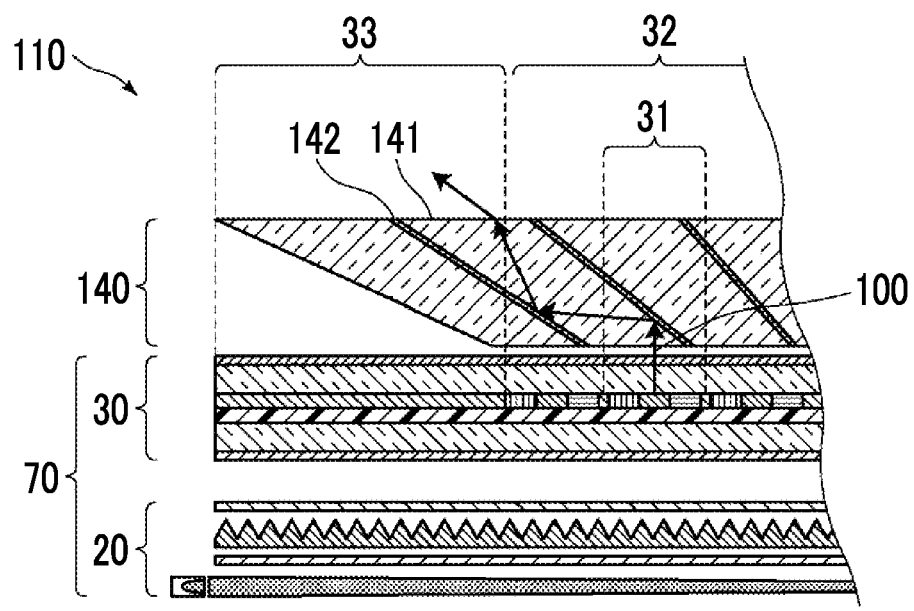
FIG. 1 is a schematic view illustrating a narrow frame image display device of the related art.

FIG. 1 is a cross-sectional view schematically illustrating a part of an edge of an image display area and a frame area of a frame-narrowed image display device 110 of the related art. The image display device 110 comprises a liquid crystal display device 70 comprising a backlight unit 20 and an image display unit 30, and a light guide unit 140 formed of fiber optics in this order. The image display unit 30 comprises a display area 32 in which a plurality of pixels 31 are arranged, and a non-display area 33 disposed in the periphery of this display area 32. The light guide unit 140 is divided into a plurality of light guide areas 141, and light guide areas 141 adjacent to each other are separated by a boundary 142.

Some light beams 100 emitted from the pixel 31 are incident on the light guide areas 141, guided in a direction toward the non-display area 33 while repeating total reflection on the interface with the boundary 142, and emitted from the surface of the light guide unit 140. At this time, an image is enlarged in a case where the area of the light guide areas 141 on an emission side (that is, on a viewing side of the light guide unit 140) is larger than the area thereof on an incident side (that is, on a side of the surface in contact with the image display unit 30).

In this manner, the image of the display area 32 is slightly enlarged to cover a part or the entirety of the non-display area 33. As the result, the non-display area 33 is visually recognized to be narrowed from the front side or is not visually recognized at all. Accordingly, the frame can be narrowed.

Figure 2:
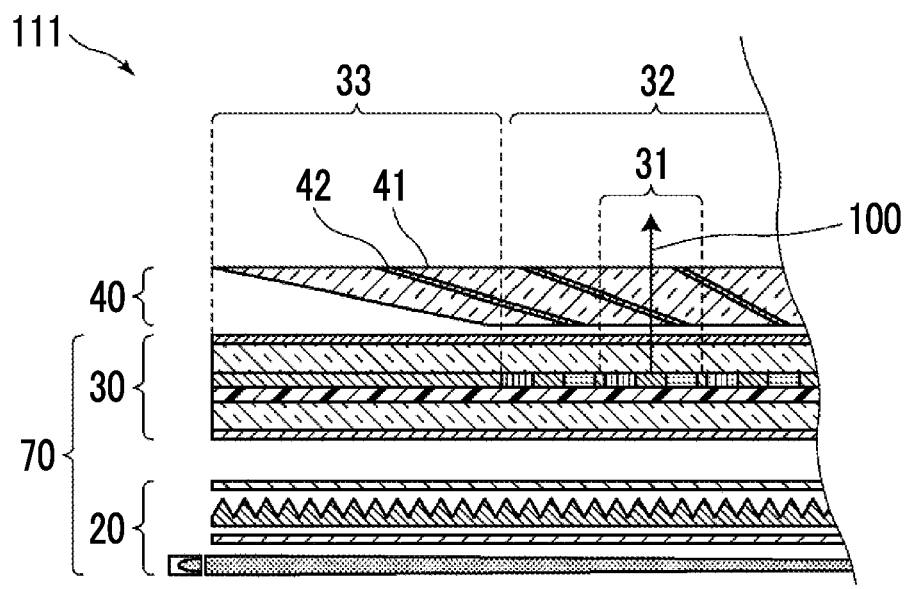
FIG. 2 is a schematic view illustrating a narrow frame image display device of the related art in a case where the thickness of a light guide unit is reduced.
Figure 3:
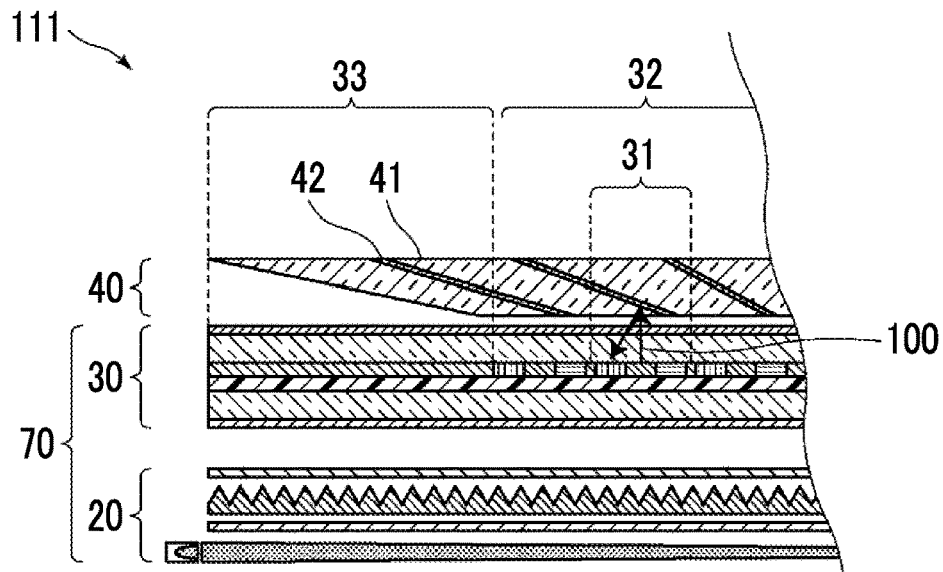
FIG. 3 is a schematic view illustrating a narrow frame image display device of the related art in a case where the thickness of a light guide unit is reduced.

FIG. 2 and FIG. 3 are schematic views illustrating an image display device 111 comprising a light guide unit 40 with a small thickness in place of the light guide unit 140 of the image display device 110. In order to guide the light beams 100 to a predetermined position while reducing the thickness of the light guide unit, the light guide area 41 of the light guide unit 40 needs to be largely inclined as illustrated in the schematic view of FIG. 2. However, at this time, the light beams 100 incident on the incident surface of the light guide area 41 substantially vertically are incident on the interface between the light guide area 41 and the boundary 42 at a small incidence angle, and the light beams may be incident on the adjacent light guide area 41 without satisfying the total reflection conditions. In this case, the light beams from different pixels are mixed. Therefore, crosstalk occurs and the image is not appropriately displayed.

In addition, in a case where the incidence angle from the light guide area 41 to the boundary 42 is small, some light beams 100 can be totally reflected. Further, in a case where the boundary 42 is formed of a reflective member such as a metal, a large quantity of the light beams 100 are reflected. However, as illustrated in FIG. 3, in a case where the incidence angle of light on the interface between the light guide area 41 and the boundary 42 is small, the reflection angle is decreased, and the light beams 100 can be returned to the incident surface of the light guide area 41. In this case, the light beams 100 are wasted by being emitted from the incident surface and absorbed by the image display unit 30. As the result, the brightness of the image display is decreased.

As described above, it is not preferable to reduce the thickness of the light guide unit in the narrow frame image display device of the related art from the viewpoint that the light guide efficiency of light beams is significantly decreased, the brightness of the image display is decreased, and light beams from the pixels adjacent to each other are mixed to cause crosstalk.

[Image Display Device of Present Invention]

Figure 4:
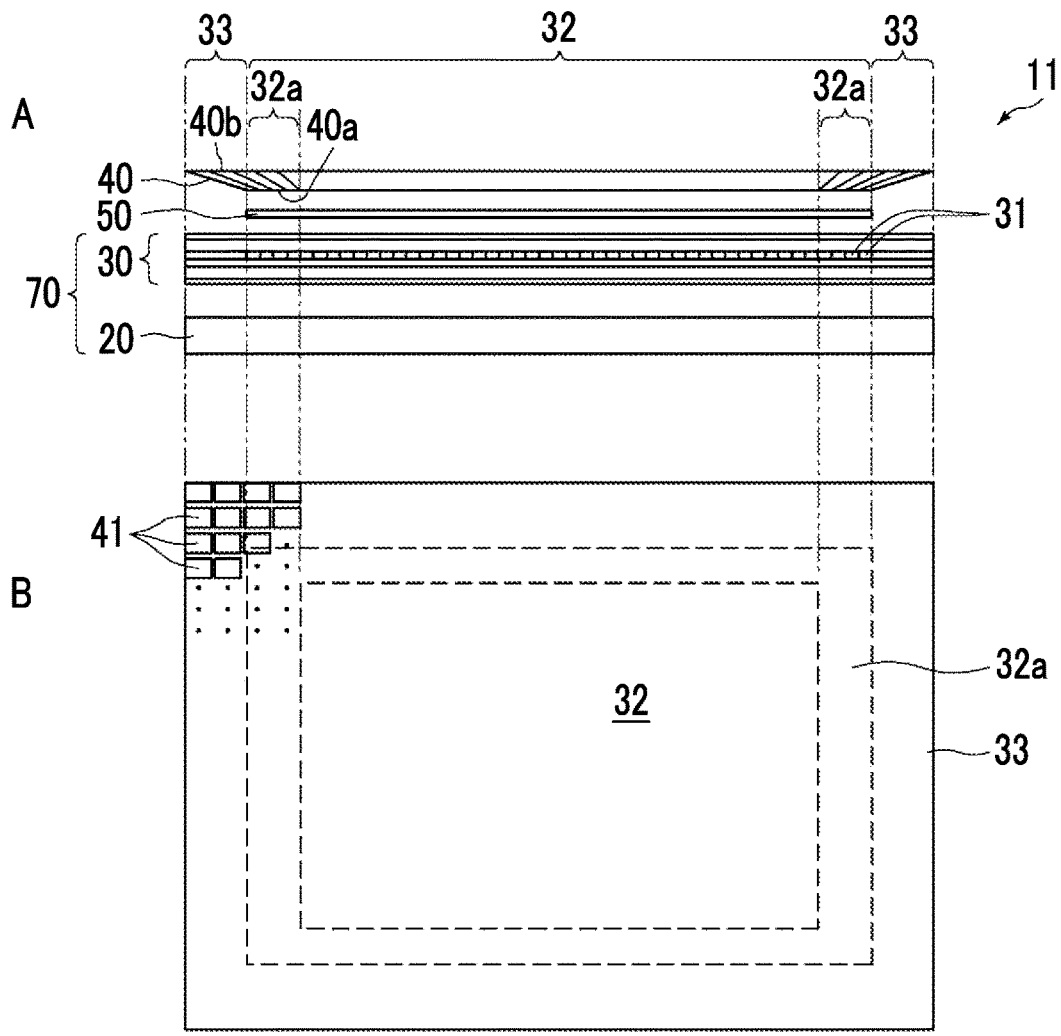
FIG. 4 is a schematic view illustrating an example of an image display device of the present invention.
Figure 5:
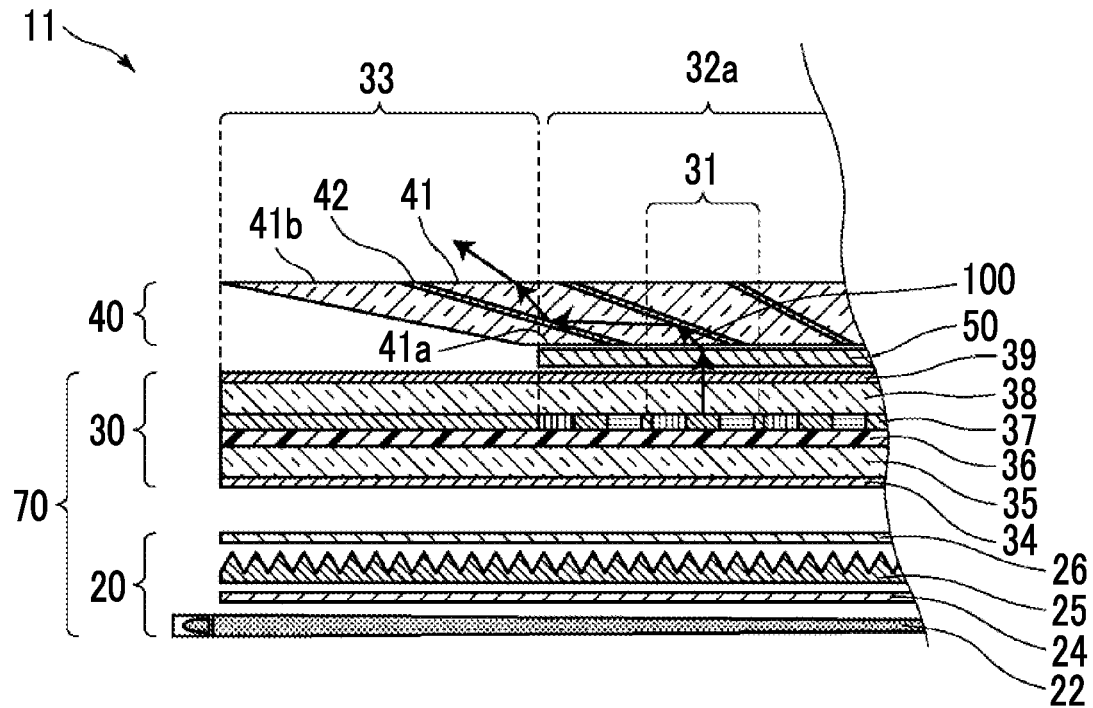
FIG. 5 is a schematic view illustrating the image display device of FIG. 4 by enlarging a part thereof.

Hereinafter, an image display device according to an embodiment of the present invention will be described. FIG. 4 is a view illustrating a schematic configuration of an image display device 11 according to an embodiment and illustrates a side surface A and a flat surface B of the image display device 11. FIG. 5 is a cross-sectional view schematically illustrating the image display device 11 by enlarging a part thereof.

As illustrated in FIG. 4, the image display device 11 comprises the backlight unit 20, the image display unit 30, the light guide unit 40, and a diffraction element 50 exhibiting an optical path conversion function. Here, the image display unit 30 forms the liquid crystal display device 70 together with the backlight unit 20.

The image display unit 30 comprises the display area 32 in which the plurality of pixels 31 are arranged and the non-display area 33 provided at the periphery of the display area 32.

The light guide unit 40 has one surface 40a disposed so as to face at least an edge 32a of the display area 32 of the image display unit 30 on a viewing side and the other surface 40b that is disposed at an opposite side of the light guide from the one surface 40a and is provided at a position shifted further toward the non-display area 33 than the one surface 40a. Here, the edge 32a of the display area 32 indicates an end area in the display area 32. Here, as illustrated in FIG. 5, the light guide unit 40 is formed of fiber optics having the plurality of light guide areas 41 and the boundaries 42 that separate the respective light guide areas 41.

The one surface 40a of the light guide unit 40 is a surface on the side of the image display unit 30, and the other surface 40b is a surface on the viewing side. The light guide unit 40 may be provided to cover at least a part of the edge 32a of the display area 32 and the non-display area 33 adjacent to the part of the edge 32a, but it is preferable that the light guide unit 40 is provided to cover the entire region of the edge 32a and the non-display area 33 and also preferable that the light guide unit 40 is disposed to cover the entire image display unit including the display area 32 and the non-display area 33.

The diffraction element 50 is disposed between the image display unit 30 and the light guide unit 40 and diffracts light from the display area 32 to the side of the non-display area 33 adjacent to the edge 32a.

With the present configuration, in the image display device 11, at least some light beams emitted from the edge 32a of the display area 32 of the image display unit 30 are diffracted to the side of the non-display area 33 by the diffraction element 50, incident on the one surface 40a of the light guide unit 40, guided by the light guide unit 40, and emitted from the other surface 40b of the light guide unit 40.

As illustrated in FIG. 5, the backlight unit 20 comprises a light source, a light guide member 22 which guides light from the light source, a first diffusion sheet 24, a prism sheet 25, and a second diffusion sheet 26.

The image display unit 30 is a liquid crystal cell which comprises a backlight-side polarizer 34, a first base material 35, a liquid crystal layer 36 interposed between electrode layers (not illustrated), a color filter 37, a second base material 38, and a viewing-side polarizer 39.

As illustrated in FIG. 5, some light beams 100 emitted from the pixel 31 are incident on the diffraction element 50, diffracted in a direction toward the non-display area 33, and incident on the light guide area 41. Accordingly, the incidence angle from the light guide area 41 to the boundary 42 increases, and thus the rate of the total reflection increases. As the result, the light guide efficiency in the light guide area 41 is greatly improved. Here, the expression of "diffracted in a direction toward the non-display area 33" means that the traveling direction of incident light is inclined to the side of the non-display area 33.

As described above, in the image display device 11, since some light beams 100 of emitted light from the display area 32 are guided to the side of the non-display area 33 by the light guide unit 40, the image of the display area 32 can be seen by being enlarged up to the non-display area 33. As the result, the frame of the image display device can be narrowed. Further, since the emitted light from the display area 32 can be diffracted by the diffraction element 50 to be incident on the light guide unit 40, the image is appropriately displayed without decreasing the light guide efficiency even in a case where the thickness of the light guide unit 40 is reduced. Therefore, the total thickness of the image display device can be reduced.

Hereinafter, each element of the image display device will be described in more detail, and design modification examples of the image display device will also be described.

[Image Display Unit]

As described above, the image display unit 30 comprises a display area in which a plurality of pixels are arranged and a non-display area provided at the periphery of this display area. The image display surface of the image display unit may be a flat surface or a curved surface.

The image display unit may be a still image or a photograph or may be an image display device. In the embodiment, the case where the image display unit 30 is a liquid crystal cell and comprises a liquid crystal display device comprising a backlight unit on a side opposite to a viewing side of the image display unit has been described. Further, as the image display device, an organic EL display device, an LED display device, or an MEMS shutter display device can be suitably used in addition to the liquid crystal display device.

The light emitted from the image display unit may be emitted in various directions or may be condensed and emitted in a specific direction. It is preferable that the light beams to be emitted are condensed in the front direction or in a direction toward the non-display area from the viewpoint of easily improving the light guide efficiency in the light guide unit. For example, in the liquid crystal display device, the emitted light from the image display unit can be condensed by allowing the backlight unit to have a condensing function.

Further, in a case where the following polarization diffraction grating is used as the diffraction element 50, it is preferable that the image display unit emits polarized light. It is particularly preferable that the image display unit emits circularly polarized light. In a case where the image display device that emits circularly polarized light and the polarization diffraction grating are used in combination, the diffraction efficiency in a specific direction is increased, the brightness of an image is improved, and occurrence of double images or ghost can be suppressed.

Among commercially available liquid crystal image display devices and organic EL display devices, those emitting circularly polarized light can be suitably used. Further, in a case where an image display device emitting linearly polarized light is used as the image display unit, the linearly polarized light can be converted into circularly polarized light by laminating a phase conversion layer such as a ¼ wavelength phase difference plate on the surface of the image display device.

[Diffraction Element]

The diffraction element 50 is an optical element which has a fine periodic structure with a wavelength of visible light in a plane, separates incident light beams in a plurality of directions, and refracts light beams in a direction different from the incident direction. Here, the diffraction element is an optical path conversion unit which is disposed between the image display unit and the light guide unit, diffracts light beams emitted from the pixels at the edge of the display area of the image display unit in a direction inclined to the side of the non-display area adjacent to the edge, and converts the optical path. The diffraction efficiency of the diffraction element is preferably high and ideally 1. As the diffraction element, a typical diffraction grating, a holographic diffraction grating, a surface relief diffraction grating, a blazed diffraction grating, or a polarization diffraction grating can be used. Among these, a blazed diffraction grating or a polarization diffraction grating is preferable from the viewpoint of maximizing the diffraction efficiency of a specific diffraction order.

[Polarization Diffraction Grating]

Figure 6:
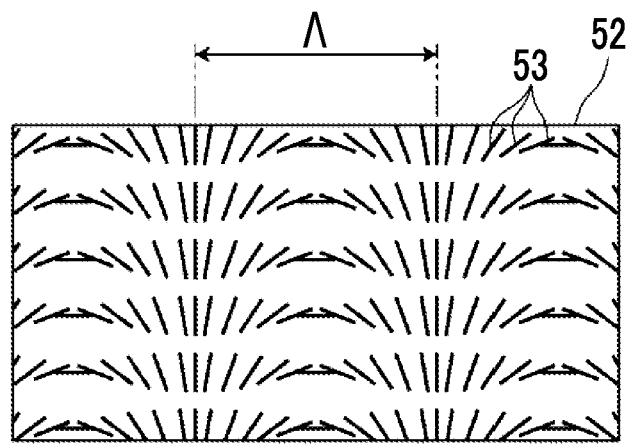
FIG. 6 is a plan view schematically illustrating an example of a polarization diffraction grating.

The polarization diffraction grating is a diffraction grating in which the liquid crystal molecules are aligned such that the orientation of an optical axis rotates in the plane with a period of approximately the wavelength of visible light. FIG. 6 schematically illustrates the polarization diffraction grating 52. The liquid crystal molecules are aligned such that an optical axis 53 rotates at 180° with a period A in one direction on the plane, that is, the lateral direction on the paper surface in FIG. 6. The principle, the function, and the preparation method of the polarization diffraction grating can be referred to Optica vol. 2, 11, 958 (2015) (written by Jihwan Kim, Yanming Li, Matthew N. Miskiewicz, Chulwoo Oh, Michael W. Kudenov, and Michael J. Escuti) or JP5276847B.

The polarization diffraction grating can increase the diffraction efficiency of light beams in a specific wavelength range depending on the kind of liquid crystal molecules to be used and the thickness of the liquid crystal layer. Further, the diffraction direction of light beams can be changed by adjusting the period in which the orientation of the optical axis of the liquid crystal molecules rotates. Accordingly, in order for the light beams emitted from the image display unit to be efficiently incident on the light guide layer, the period in which the orientation of the optical axis of the liquid crystal molecules rotates may be continuously changed in the plane depending on the location.

Further, the polarization diffraction grating can separate incident light in two different polarization states or diffract the incident light in different directions depending on the polarization state of the incident light. For example, in a case where the incident light is circularly polarized light, the polarization diffraction grating can diffract the circularly polarized light in different directions according to the rotation direction of the circularly polarized light. Therefore, in a case where the light emitted from the image display unit is circularly polarized light, the polarization diffraction grating can be used such that the light beams can be diffracted in a direction toward the non-display area with high efficiency. In this manner, the light guide efficiency in the light guide area can be increased, the brightness of an image can be improved, and the occurrence of double images and ghost can be suppressed.

Figure 7:
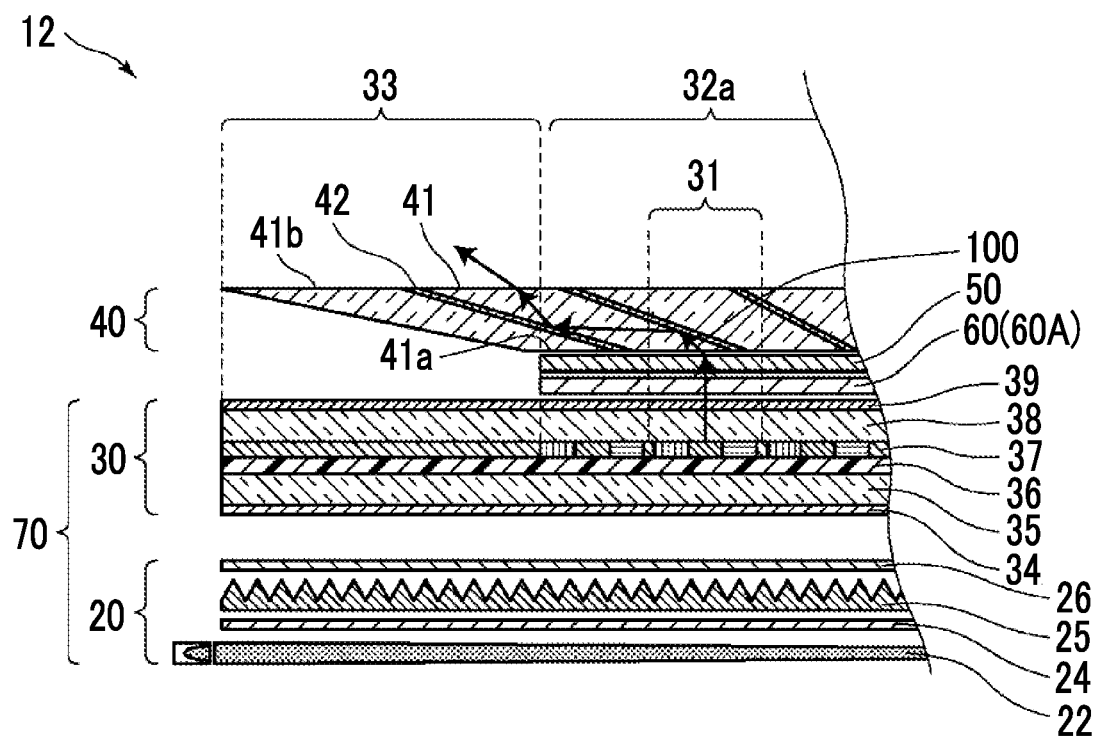
FIG. 7 is a cross-sectional view schematically illustrating an image display device of Design Modification Example 1 by enlarging a part thereof.

It is preferable that the image display device comprises a reflective polarizer functioning as a part of the optical path conversion unit, in addition to the diffraction element 50. FIG. 7 is a cross-sectional view schematically illustrating an image display device 12 of Design Modification Example 1 by enlarging a part of the image display device 12. In the description below, the same constituent elements as the constituent elements described above are denoted by the same reference numerals, and the detailed description will not be provided. The image display device 12 comprises a reflective polarizer 60 between the image display unit 30 and the diffraction element 50 in the above-described image display device 11. Further, the reflective polarizer 60 may be disposed between the diffraction element 50 and the light guide unit 40.

[Reflective Polarizer]

Figure 8:
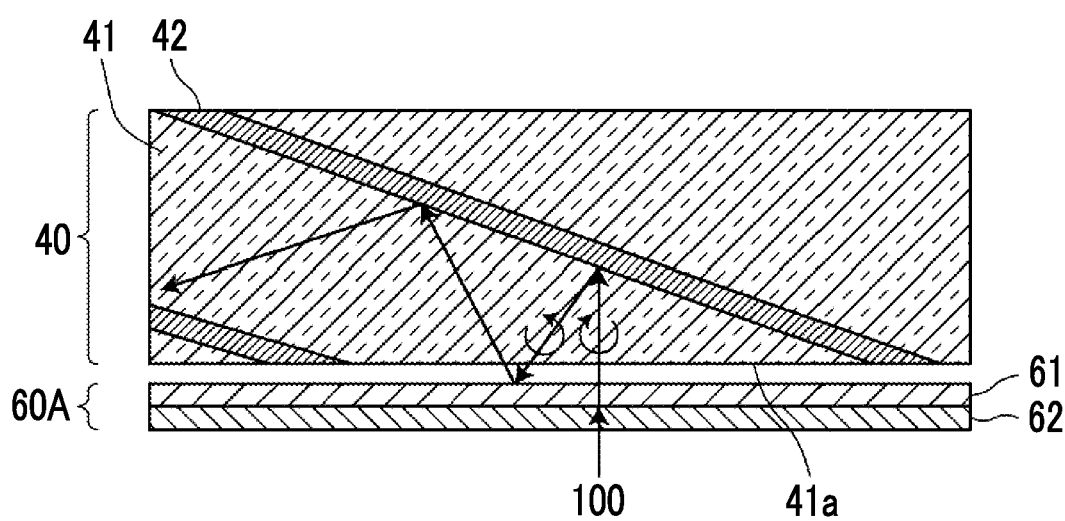
FIG. 8 is a view for describing an effect obtained in a case where an image display device comprises a reflective circular polarizer.

The reflective polarizer 60 is an optical member that reflects one polarized light among incident light and transmits the other polarized light. Among these, a reflective circular polarizer is preferable. In a case where the reflective polarizer 60 is a reflective circular polarizer 60A, the reflective circular polarizer 60A is provided such that light beams incident on the light guide unit 40 become circularly polarized light. In this manner, as illustrated in FIG. 8, the light beams 100 transmitted through the reflective circular polarizer 60A and incident on the light guide area 41 become circularly polarized light and are reflected in a direction opposite to the rotation direction of the circularly polarized light in a case where the light is reflected on the interface between the light guide area 41 and the boundary 42.

Accordingly, in a case where the light beams 100 are returned to an incident surface 41a of the light guide area 41, the light beams 100 are reflected on the reflective circular polarizer 60A, incident on the light guide area 41 again, and guided. In FIG. 8, the diffraction element 50 is not illustrated for simplicity, but the effect from the reflective circular polarizer 60A is the same as in the case where the diffraction element 50 is comprised even though the optical path of the light beams is different from the optical path in the case where the diffraction element 50 is comprised.

The reflective circular polarizer 60A is prepared by laminating a reflective linear polarizer 62 and a ¼ wavelength phase difference plate 61. At this time, the lamination is made such that the angle between the direction of the transmission axis of the reflective linear polarizer 62 and the direction of the slow axis of the ¼ wavelength phase difference plate 61 is set to 45°. Further, the ¼ wavelength phase difference plate 61 is provided closer to the viewing side at least than the reflective linear polarizer 62, but it is preferable that the ¼ wavelength phase difference plate 61 further is laminated closer to the side of the image display unit than the reflective linear polarizer 62 in a case where the image display unit emits circularly polarized light. As the reflective polarizer, a film obtained by stretching a layer containing two kinds of polymers, a wire grid polarizer, or the like described in JP2011-053705A can be used. As the commercially available products, a reflective polarizer (trade name, APF, manufactured by 3M Japan Ltd.) and a wire grid polarizer (trade name, WGF, manufactured by Asahi Kasei Corporation), and the like can be suitably used. Further, the ¼ wavelength phase difference plate may have a phase difference which becomes an approximately ¼ wavelength at any wavelength in the visible range. For example, a phase difference plate having a phase difference of 138 nm at a wavelength of 550 nm can be suitably used. Examples of the commercially available product thereof include PURE-ACE WR W-142 (manufactured by Teijin Ltd.). Further, as the reflective circular polarizer 60A, a cholesteric liquid crystal layer in which rod-like liquid crystal molecules are spirally aligned can be used. In this case, the direction in which the light beams are reflected can also be controlled by setting each spiral axis of the liquid crystal molecules to be in a direction inclined from the direction perpendicular to the surface of the reflective circular polarizer 60A.

[Light Guide Unit]

The light guide unit 40 is an optical member that guides some or all light beams incident on the one surface 40a which is an incident surface to the other surface 40b which is an emission surface. Fiber optics obtained by bundling a plurality of optical fibers or porous alumina obtained by anodizing an aluminum plate can be used as the light guide unit 40. Further, it is preferable that the light guide unit 40 is divided into a plurality of light guide areas 41 as described above. It is preferable that the light guide unit 40 is divided into a plurality of light guide areas 41 from the viewpoint that incident light beams can be easily guided to a predetermined position. In each light guide area 41, at least some incident light beams are guided while repeating total reflection at the interface with the boundary 42 that separates the light guide area 41 from the light guide area 41.

It is preferable that the boundary 42 that separates the plurality of light guide areas 41 is formed to include a low-refractive index layer, an air layer, a reflective layer, or a dielectric multilayer film. It is preferable that the light guide unit 40 has the above-described structure from the viewpoint that the efficiency of the total reflection on the interface between the light guide area 41 and the boundary 42 can be increased.

Further, the boundary 42 that separates the plurality of light guide areas 41 may include a light absorption layer. It is preferable that the boundary 42 includes a light absorption layer from the viewpoint that light beams incident on the boundary 42 from the light guide area 41 can be absorbed so that the incidence of light beams on the adjacent light guide area 41 can be suppressed.

The area of the incident surface 41a of the light guide area 41 is preferably less than or equal to the area of the pixel 31 of the image display unit 30. It is preferable that the area of the light guide area 41 is less than or equal to the area of the pixel 31 from the viewpoint that light beams emitted from different pixels 31 are not mixed so that crosstalk and blurring are suppressed and a high-resolution image can be displayed.

The area of an emission surface 41b of the light guide area 41 is preferably greater than or equal to the area of the incident surface 41a. Further, it is preferable that the emission surface 41b of the light guide area 41 is at a position that is moved in a direction parallel to the non-display area 33 with respect to the incident surface 41a. It is preferable that the light guide area 41 has the above-described shape from the viewpoint that the image is enlarged so that a part or the entirety of the non-display area 33 of the image display unit 30 can be covered.

A diffraction element may be fabricated on the side of the incident surface of the light guide area.

Figure 9:
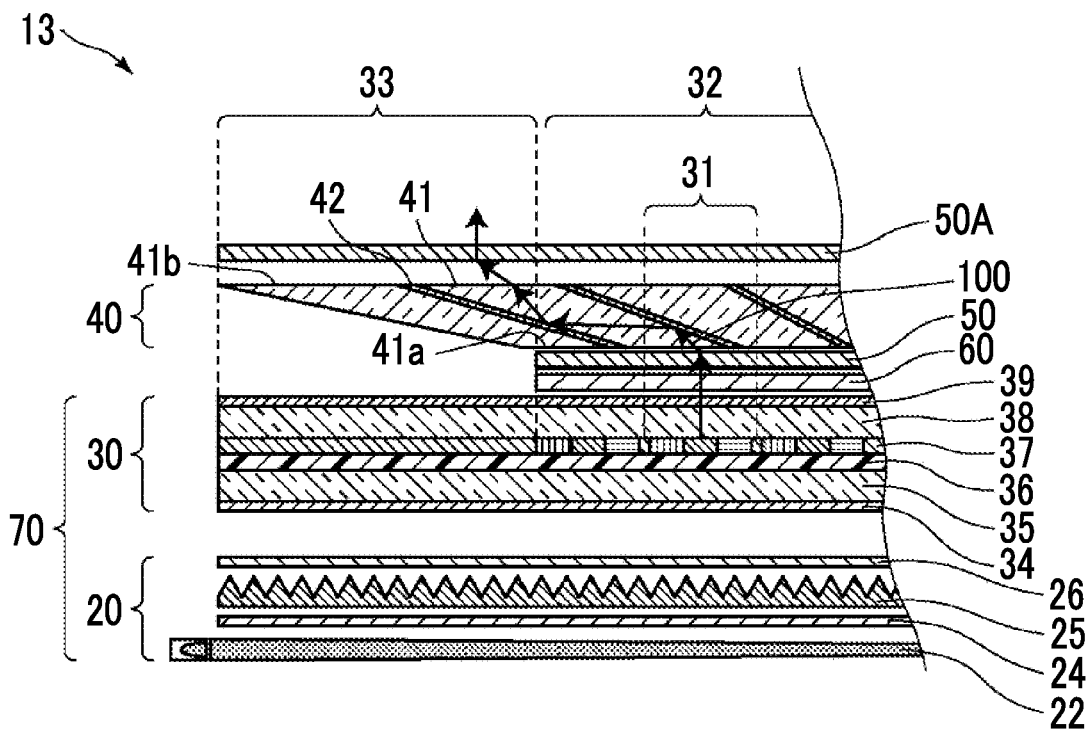
FIG. 9 is a cross-sectional view schematically illustrating an image display device of Design Modification Example 2 by enlarging a part thereof.

It is preferable that the light guide unit 40 comprises a refractive element or a light scattering unit on the emission surface side thereof. It is preferable that the refractive element or the light scattering unit is provided at the emission surface side of the light guide unit from the viewpoint that light beams can be emitted in various directions and the range of the viewing angle where the image is appropriately visually recognized can be expanded. As the refractive element, the same element as the above-described diffraction element can be used. FIG. 9 is a cross-sectional view schematically illustrating an image display device 13 of Design Modification Example 2 by enlarging a part thereof. As illustrated in FIG. 9, a diffraction element 50A which is the same as the diffraction element 50 provided between the image display unit 30 and the light guide unit 40 may be comprised on the emission surface side of the light guide unit 40. Further, a light scattering unit may be comprised in place of this diffraction element 50A. Further, the light scattering unit can be formed by attaching a typical light scattering film or diffusion film or imparting fine unevenness to the surface.

Figure 10:
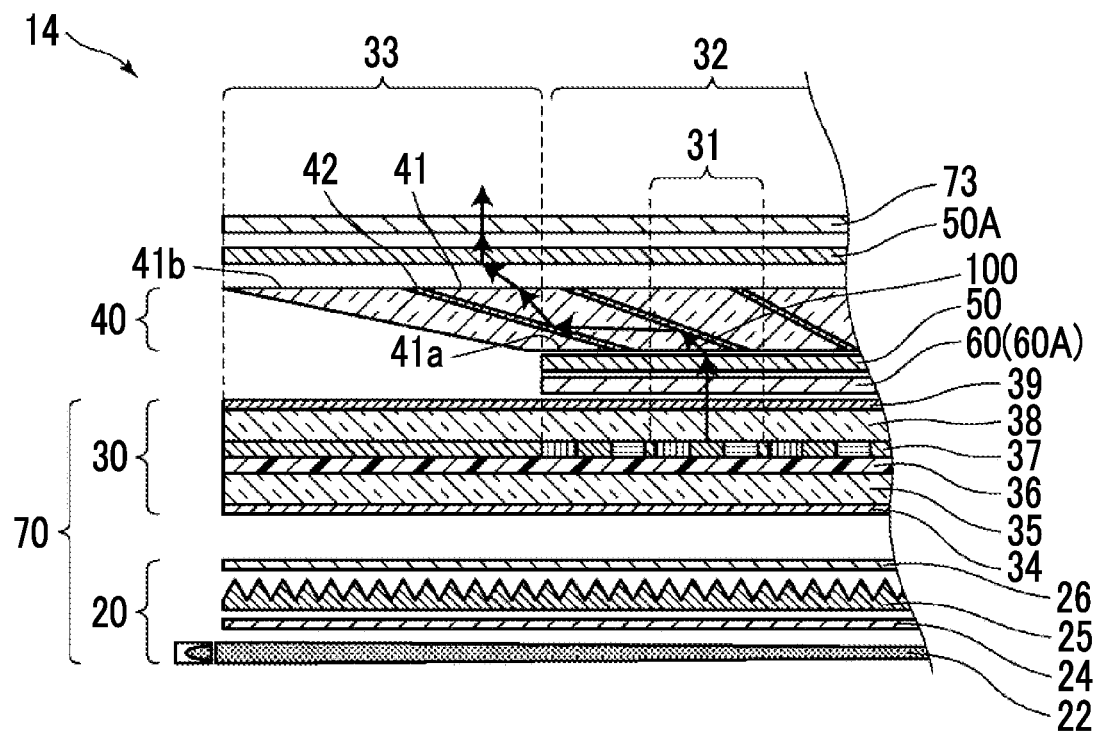
FIG. 10 is a cross-sectional view schematically illustrating an image display device of Design Modification Example 3 by enlarging a part thereof.

Further, FIG. 10 is a cross-sectional view schematically illustrating an image display device 14 of Design Modification Example 3 by enlarging a part thereof. As illustrated in FIG. 10, it is preferable that a circular polarizer 73 is comprised on the emission surface side of the light guide unit 40. In FIG. 10, the diffraction element 50A and the circular polarizer 73 are comprised on the surface of the light guide unit 40, but only the circular polarizer 73 may be comprised thereon. The circular polarizer 73 is provided such that light beams incident from the viewing side become circularly polarized light and are incident on the light guide unit 40. Further, in a case where the reflective polarizer 60 comprised between the light guide unit 40 and the image display unit 30 is the reflective circular polarizer 60A, it is preferable that the polarization direction of the circular polarizer is selected such that a large quantity of light beams that have been transmitted through the reflective circular polarizer 60A and have been guided to the light guide area are emitted.

It is preferable that a circular polarizer 73 is provided at the surface of the light guide unit 40 from the viewpoint that reflected light to be generated by reflection of the light beams incident from the viewing side on the surface of the light guide unit and/or inside the light guide unit 40 can be suppressed and the visibility of the image can be improved.

As the circular polarizer 73, for example, a polarizer obtained by laminating a linear polarizer and a ¼ wavelength phase difference plate can be used. At this time, the linear polarizer is provided closer to the viewing side than the ¼ wavelength phase difference plate.

The light guide unit may be provided to cover only a part or the entirety of the image display unit, but it is preferable that the light guide unit is provided to cover at least a part of the display area in the image display unit and at least a part of the non-display area. In this manner, some light beams emitted from the pixel of the display area are guided to the non-display area so that a part of the non-display area cannot be visually recognized.

It is preferable that the light guide unit is thinned within a range where the light guide efficiency in the light guide area is not significantly impaired. The thickness of the light guide unit is not limited, but is preferably 5 mm or less, more preferably 2 mm or less, and most preferably 1 mm or less.

Further, even in a case where the diffraction element 50 is not comprised between the image display unit 30 and the light guide unit 40, the effect of improving the brightness can be obtained by comprising the reflective polarizer 60 between the image display unit 30 and the light guide unit 40.

Figure 11:
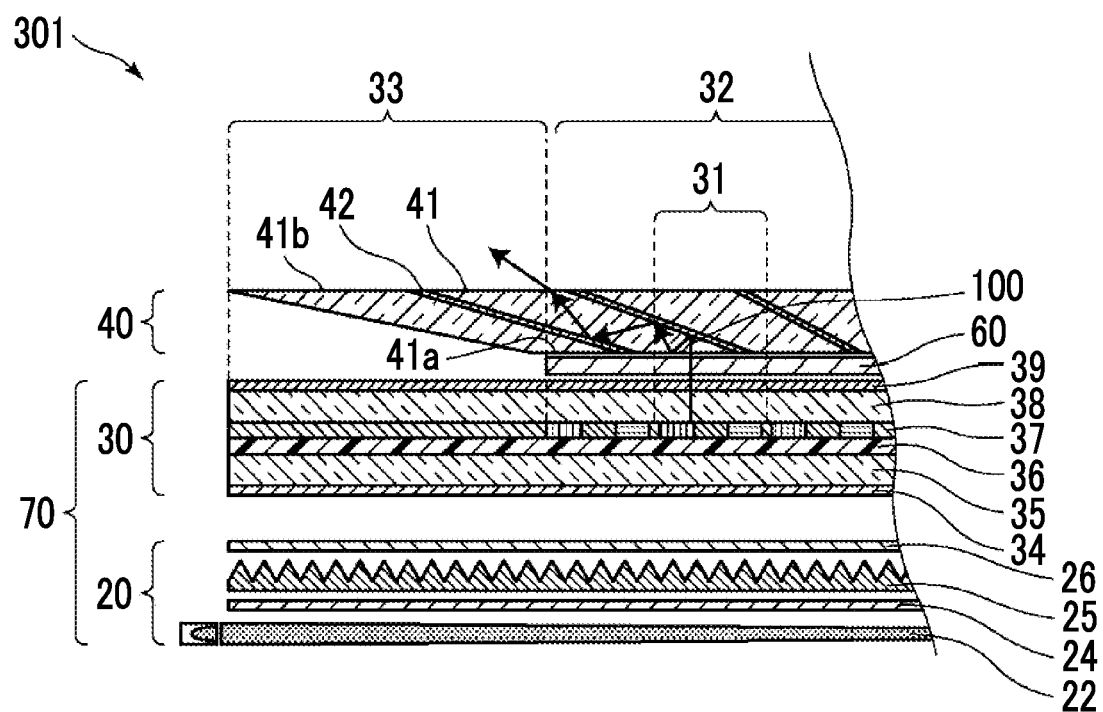
FIG. 11 is a cross-sectional view schematically illustrating an image display device of Reference Example 1 by enlarging a part thereof.

FIG. 11 is a cross-sectional view schematically illustrating the schematic configuration of an image display device of Reference Example 1 described below. An image display device 301 comprises the backlight unit 20, the image display unit 30, the reflective polarizer 60, and the light guide unit 40 in this order. The light guide unit 40 is formed of fiber optics including a plurality of light guide areas 41 and the boundary 42.

Some light beams 100 emitted from the pixel 31 are transmitted through the reflective polarizer 60 and incident on the light guide area 41. Since the incidence angle from the light guide area 41 and the boundary 42 is small, some light beams 100 are reflected on the interface with the boundary 42 and returned in the direction of the pixel 31, but are reflected by the reflective polarizer 60. Therefore, the light beams 100 are incident on the light guide area 41 again and guided. As the result, the light guide efficiency in the light guide area 41 is improved.

Examples of the element functioning as the optical path conversion unit disposed between the image display device and the light guide unit include a prism element and a bent light guide in addition to the diffraction element.

[Bent Light Guide]

Figure 12:
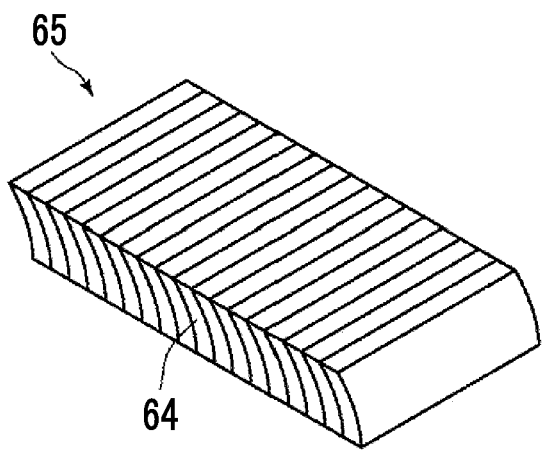
FIG. 12 is a schematic view illustrating an example of a bent light guide.

The bent light guide is an optical member that guides some or all light beams incident from the incident surface while bending the light beams. As the light guide, an element obtained by bundling a plurality of bent optical fibers, an element (a bent light guide 65) obtained by laminating a plurality of bent light guide layers 64 as illustrated in FIG. 12, or the like can be used. From the viewpoint of preventing light beams emitted from different pixels from being mixed, an element formed by bundling a plurality of optical fibers is preferable. Further, in a case where the thickness of the light guide layer is sufficiently small and spread of light beams is suppressed, the light guide may be a light guide layer.

Figure 13:
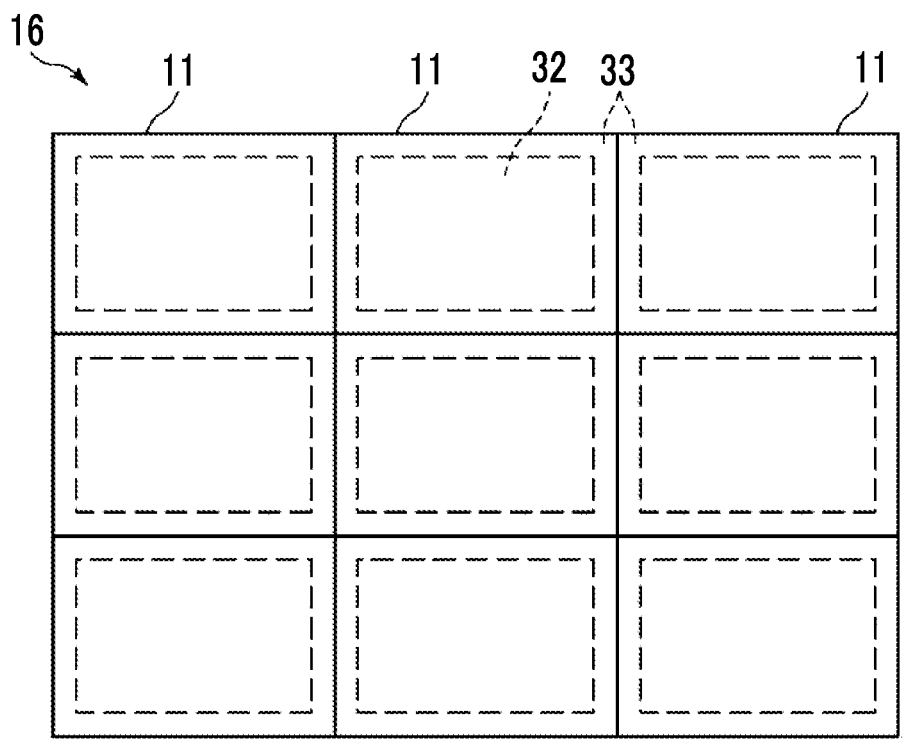
FIG. 13 is a plan view schematically illustrating an image display device formed by arranging a plurality of image display devices according to an embodiment.

FIG. 13 is a plan view schematically illustrating an image display device 16 with a large screen formed by arranging a plurality of the image display devices 11 according to the embodiment. As illustrated in FIG. 13, the image display device 16 with one large screen can be formed by arranging the plurality of the image display devices 11 in parallel. Each image display unit of each image display device 11 has display areas 32 and non-display areas 33. Further, as described above, each image display device 11 comprises the light guide unit 40 and the diffraction element 50 (see FIG. 4 and FIG. 5), and the frame area is narrowed. Accordingly, an image in which an uncomfortable feeling caused by division of the image at the boundary between the image display devices 11 is reduced can be displayed in the image display device 16.

EXAMPLES

The features of the present invention will be described in more detail based on the following examples. Further, the materials, the amounts to be used, the proportions, the treatment details, and the treatment procedures can be appropriately changed within a range not departing from the scope of the present invention. Further, configurations other than the configurations described below can be employed within a range not departing from the scope of the present invention.

<Preparation of Image Display Unit>

[Preparation of Liquid Crystal Display Device]

A tablet terminal iPad mini (registered trademark) (manufactured by Apple Inc.) was prepared and used as a liquid crystal display device 70. The tablet terminal iPad mini (registered trademark) (manufactured by Apple Inc.) was a liquid crystal image display device emitting circularly polarized light. Further, a space between a backlight unit and a liquid crystal panel of the tablet terminal iPad mini (registered trademark) (manufactured by Apple Inc.) was incorporated with a louver film (RP-IPN11, manufactured by Asdec Co., Ltd.), thereby obtaining a condensed liquid crystal display device 71. The liquid crystal display device 70 and the condensed liquid crystal display device 71 each comprised a display area and a non-display area in the periphery of the display area, and the width of the non-display area in the short direction was approximately 11 mm on each of the left and right sides. Further, the condensed liquid crystal display device 71 was condensed because the backlight unit was incorporated with the louver film, and the image was unlikely to be visually recognized in a case where the image was observed at an angle of 30° in the front direction, that is, a polar angle of 30° C.

Any of the liquid crystal display device 70 or the condensed liquid crystal display device 71 was used as an image display unit of examples and comparative examples of the present invention.

<Preparation of Diffraction Element>

[Preparation of Blazed Diffraction Grating]

A transmission type blazed diffraction grating (model number: #49-586) (purchased from Edmund Optics Japan Co., Ltd.) was used as a blazed diffraction grating 51. The blazed diffraction grating 51 had a thickness of approximately 3 mm and a blaze angle of approximately 37°.

[Preparation of Polarization Diffraction Grating]

A part of a lens portion of a polarizing direct flat lens (model number: #34-463) (purchased from Edmund Optics Japan Co., Ltd.) was cut out and then used as a geometric phase diffraction grating 52. The refraction characteristics of the geometric phase diffraction grating 52 include polarization dependence. Due to this characteristic, for example, in a case where right circularly polarized light was incident vertically, the light was refracted in a direction at an angle of approximately 6° from the vertical direction.

<Preparation of Reflective Polarizer>

[Preparation of Reflective Polarizer]

A polycarbonate ¼ wavelength phase difference film (trade name, PURE ACE WR W-142, manufactured by Teijin Ltd.) was attached to both surfaces of a wire grid polarization film (trade name, WGF, manufactured by Asahi Kasei Corporation) such that the direction of the slow axis was set to 45° with the transmission axis direction of the wire grid polarization film. In this manner, a reflective circular polarizer 63 which was able to be used as a beam splitter was obtained.

<Preparation of Bent Light Guide>

One side surface of thin plate glass having a thickness of 0.5 mm was polished to obtain a curved surface with a curvature radius of 0.6 mm. Further, the opposing side surface was polished to obtain a curved surface with a curvature radius of 0.6 mm similarly, thereby obtaining a bent light guide layer 64 having a bottom thickness of 0.1 mm. Gap control particles (MICROPEARL SP, manufactured by Sekisui Chemical Co., Ltd.) having a particle diameter of 10 μm were sprayed to the curved surface of the bent light guide layer 64, and a plurality of these layers were laminated to obtain a bent light guide 65 as illustrated in FIG. 12, in which the gap was filled with an air layer.

<Preparation of Light Guide Unit>

[Preparation of Fiber Optics]

The incident surface and the emission surface of a fiber optic plate (model number: J5734, customized product, thickness of 10 mm) (manufactured by Hamamatsu Photonics K. K.) were polished to obtain a flat surface which was not parallel to the original surface, thereby obtaining fiber optics 43 with a thickness of 3 mm. The fiber optics 43 were prepared such that the angle between the optical fiber and the incident surface was approximately 20° and the incident surface and the emission surface were parallel to each other. Further, the fiber optics 43 had a plurality of light guide areas, and the boundary separating the light guide areas had a light absorption layer.

Further, the incident surface and the emission surface of a fiber optic plate (model number: J5743) (manufactured by Hamamatsu Photonics K. K.) were polished to obtain a flat surface which was not parallel to the original surface, thereby obtaining tapered fiber optics 44 with a thickness of 3 mm. The tapered fiber optics 44 were prepared such that the angle between the optical fiber and the incident surface was approximately 20° and the incident surface and the emission surface were parallel to each other. Further, the tapered fiber optics 44 had a plurality of light guide areas, and the area of the emission surface of the light guide area was larger than the area of the incident surface. Further, the boundary separating the light guide areas had a light absorption layer.

Further, the surface of a plastic optical fiber strand (model number: PGS-Fb250) (manufactured by Toray Industries, Inc.) was coated with complex silver mirror coating ink (model number: TEC-CO-021) (manufactured by InkTec Co., Ltd.) and dried at 80° C. for 20 minutes to prepare an optical fiber which had been subjected to silver mirror coating. Next, a plurality of the optical fibers were bundled, bonded using a thermosetting adhesive (model number: E-30CL) (manufactured by Henkel Japan Ltd.), heated at 80° C. for 20 minutes, and cured. In this manner, fiber optics having a reflective member on the boundary with the light guide area were prepared. The incident surface and the emission surface of the fiber optics were polished, thereby obtaining reflective fiber optics 45 with a thickness of 3 mm.

Example 1

The blazed diffraction grating 51 was provided on the surface of the liquid crystal display device 70 on the viewing side such that the incident surface covered a part of the display area and the emission surface covered a part of the non-display area at the time of observation from the front side. Further, the fiber optics 43 were provided thereon. The blazed diffraction grating 51 and the fiber optics 43 were provided such that both the blazed diffraction grating 51 and the fiber optics 43 guided light beams to the non-display area.

In this manner, an image display device 101 of Example 1 was prepared.

Example 2

An image display device 102 of Example 2 was prepared in the same manner as in Example 1 except that the fiber optics 43 were changed to the tapered fiber optics 44 in the image display device 101 of Example 1.

Example 3

An image display device 103 of Example 3 was prepared by providing the polarization diffraction grating 52 in place of the blazed diffraction grating 51 in the image display device 101 of Example 1.

Example 4

An image display device 104 of Example 4 was prepared by providing the reflective fiber optics 45 in place of the fiber optics 43 and providing the reflective circular polarizer 63 between the polarization diffraction grating 52 and the reflective fiber optics 45 in the image display device 103 of Example 3. Further, the reflective circular polarizer 63 was provided such that circularly polarized light emitting from the liquid crystal display device 70 was transmitted therethrough.

Example 5

An image display device 105 of Example 5 was prepared by further providing the polarization diffraction grating 52 on the emission surface side of the reflective fiber optics 45 in the image display device 104 of Example 4.

Example 6

A diffusion film (model number: 100SXE) (manufactured by Kimoto Co., Ltd.) serving as a light scattering film 72 was attached to the emission surface side of the reflective fiber optics 45 in the image display device 104 of Example 4.

In this manner, an image display device 106 of Example 6 was prepared.

Example 7

A circular polarizer 73 prepared by attaching a ¼ wavelength phase difference film (trade name, PURE ACE WR W-142, manufactured by Teijin Ltd.) to an absorption type linear polarizer was attached to a further emission surface side of the polarization diffraction grating 52 provided on the emission surface side in the image display device 105 of Example 5. The circular polarizer 73 was provided such that the absorption type linear polarizer became the emission surface side.

In this manner, an image display device 107 of Example 7 was prepared.

Example 8

An image display device 108 of Example 8 was prepared in the same manner as in Example 7 except that the liquid crystal display device 70 was changed to the condensed liquid crystal display device 71 in the image display device 107 of Example 7.

Comparative Example 1

An image display device 201 of Comparative Example 1 was prepared in the same manner as in Example 1 except that the blazed diffraction grating 51 was not provided in the image display device 101 of Example 1.

Comparative Example 2

Fiber optics 46 having a thickness of 6 mm were obtained by changing the angle at which the incident surface and the emission surface were polished in the preparation of the fiber optics 43. The fiber optics 46 were prepared such that the angle between the optical fiber and the incident surface was set to approximately 40° and the incident surface and the emission surface became parallel with each other.

An image display device 202 of Comparative Example 2 was prepared in the same manner as in Comparative Example 1 except that the fiber optics 43 were changed to the fiber optics 46 in the image display device 201 of Comparative Example 1.

Comparative Example 3

Fiber optics 47 having a thickness of 3 mm were obtained by further polishing the incident surface of the fiber optics 46. The fiber optics 47 were prepared such that the angle between the optical fiber and the incident surface was set to approximately 40° and the incident surface and the emission surface became parallel with each other.

An image display device 203 of Comparative Example 3 was prepared in the same manner as in Comparative Example 1 except that the fiber optics 43 were changed to the fiber optics 47 in the image display device 201 of Comparative Example 1.

Reference Example 1

The reflective circular polarizer 63 was provided in place of the blazed diffraction grating 51 in the image display device 101 of Example 1. Further, the reflective circular polarizer 63 was provided such that circularly polarized light emitting from the liquid crystal display device 70 was transmitted therethrough. Next, the reflective fiber optics 45 were provided in place of the fiber optics 43.

In this manner, an image display device 301 of Reference Example 1 was prepared.

Reference Example 2

An image display device 302 of Reference Example 2 was prepared in the same manner as in Example 1 except that the blazed diffraction grating 51 was changed to the bent light guide 65 in the image display device 101 of Example 1.

<Evaluation of Image Display Device>

[Method of Evaluating Width of Frame which was Visually Recognized]

In all the prepared image display devices of the examples and the comparative examples, light emitted from the display area was guided to a part of the non-display area side by the light guide unit. The region of the non-display area which was not covered by the light guide unit was regarded as the frame, and the width of the frame which was visually recognized at the time of observation from the front side was measured. The results are listed in Table 1 and Table 2.

[Method of Evaluating Brightness in Front Side]

The entire region where the light guide unit of the prepared image display device was provided was displayed in white, and the brightness in the front direction in this region was measured using a spectroradiometer "SR-3" (manufactured by Topcon Corporation). The results are listed in Table 1 and Table 2.

[Method of Evaluating Brightness at Polar Angle of 45°]

The entire region where the light guide unit of the prepared image display device was provided was displayed in white, and the brightness in a direction at which the polar angle was set to 45° on a side opposite to the non-display area with respect to the front side in this region was measured using a spectroradiometer "SR-3" (manufactured by Topcon Corporation). The results are listed in Table 1 and Table 2.

[Method of Evaluating Blurring of Image]

In the region where the light guide unit of the prepared image display device was provided, a black straight line and a white straight line were displayed in every other pixel, and the blurring of the image after passing through the light guide unit was visually evaluated from the front side. The results are listed in Table 1 and Table 2. Further, the evaluation standards are as follows.

<Evaluation Standards>

A: The white line was clearly visually recognized.
B: Blurring of the white line was visually recognized.
C: The black line and the white line were not distinguished from each other.

TABLE 1

|  |  | Example 1 | Example 2 | Example 3 | Example 4 | Example 5 | Example 6 |
|---|---|---|---|---|---|---|---|
| Number of image display device |  | 101 | 102 | 103 | 104 | 105 | 106 |
| Image display unit | Type | Liquid crystal display device 70 | Liquid crystal display device 70 | Liquid crystal display device 70 | Liquid crystal display device 70 | Liquid crystal display device 70 | Liquid crystal display device 70 |
|  | Width of frame [mm] | 11 | 11 | 11 | 11 | 11 | 11 |

TABLE 1-continued

|  |  | Example 1 | Example 2 | Example 3 | Example 4 | Example 5 | Example 6 |
|---|---|---|---|---|---|---|---|
| Optical path diversion unit | Refractive element | Blazed diffraction grating 51 | Blazed diffraction grating 51 | Polarization diffraction grating 52 | Polarization diffraction grating 52 | Polarization diffraction grating 52 | Polarization diffraction grating 52 |
|  | Beam splitter | Not available | Not available | Not available | Reflective circular polarizer 63 | Reflective circular polarizer 63 | Reflective circular polarizer 63 |
| Light guide unit | Type | Fiber optics 43 | Tapered fiber optics 44 | Fiber optics 43 | Reflective fiber optics 45 | Reflective fiber optics 45 | Reflective fiber optics 45 |
|  | Thickness [mm] | 3 | 3 | 3 | 3 | 3 | 3 |
|  | Emission surface side | Not available | Not available | Not available | Not available | Reflective fiber optics 45 | Light scattering film 72 |
|  |  | Not available | Not available | Not available | Not available | Not available | Not available |
| Width of frame to be visually recognized [mm] |  | 4 | 4 | 4 | 4 | 4 | 4 |
| Brightness on front side [cd/m$^2$] |  | 113 | 126 | 144 | 261 | 245 | 232 |
| Brightness at polar angle of 45° [cd/m$^2$] |  | 12 | 28 | 30 | 46 | 147 | 169 |
| Blurring of image |  | A | A | A | A | A | B |

TABLE 2

|  |  | Example 7 | Example 8 | Comparative Example 1 | Comparative Example 2 | Comparative Example 3 | Reference Example 1 | Reference Example 2 |
|---|---|---|---|---|---|---|---|---|
| Reference Example 1 |  | 107 | 108 | 201 | 202 | 203 | 301 | 302 |
| Image display unit | Type | Liquid crystal display device 70 | Condensed liquid crystal display device 71 | Liquid crystal display device 70 | Liquid crystal display device 70 | Liquid crystal display device 70 | Liquid crystal display device 70 | Liquid crystal display device 70 |
|  | Width of frame [mm] | 11 | 11 | 11 | 11 | 11 | 11 | 11 |
| Optical path diversion unit | Refractive element | Liquid crystal display device 70 | Liquid crystal display device 70 | Not available | Not available | Not available | Not available | Bent light guide 65 |
|  | Beam splitter | Reflective circular polarizer 63 | Reflective circular polarizer 63 | Not available | Not available | Not available | Reflective circular polarizer 63 | Not available |
| Light guide unit | Type | Reflective fiber optics 45 | Reflective fiber optics 45 | Fiber optics 43 | Fiber optics 46 | Fiber optics 47 | Fiber optics 43 | Fiber optics 43 |
|  | Thickness [mm] | 3 | 3 | 3 | 6 | 3 | 3 | 3.5 |
|  | Emission surface side | Polarization diffraction grating 52 | Polarization diffraction grating 52 | Not available | Not available | Not available | Not available | Not available |
|  |  | Circular polarizer 73 | Polarization diffraction grating 52 | Not available | Not available | Not available | Not available | Not available |
| Width of frame to be visually recognized [mm] |  | 4 | 4 | 4 | 4 | 8 | 4 | 4 |
| Brightness on front side [cd/m$^2$] |  | 165 | 215 | 12 | 78 | 81 | 173 | 136 |
| Brightness at polar angle of 45° [cd/m$^2$] |  | 75 | 154 | 5 | 41 | 47 | 31 | 21 |
| Blurring of image |  | A | A | C | B | B | A | A |

All the image display device of the examples each comprised a diffraction grating as an optical path conversion unit, the light guide efficiency in the light guide unit was improved, the width of the frame which was visually recognized regardless of the small thickness of the light guide unit was able to be reduced to 4 mm, and the front brightness was higher than that of Comparative Example 1.

Further, in all the image display devices of the examples, the area of the incident surface side of the light guide area in the light guide unit was smaller than the area of the pixel. Therefore, a high-resolution image was obtained, and blurring of the image and color separation were not almost found.

In the image display device 102 of Example 2, since the area of the light guide area of the tapered fiber optics on the emission surface side was larger than the area thereof on the incident surface side, the image was enlarged and guided to the non-display area without being interrupted or distorted.

In the image display device 103 of Example 3, the light guide efficiency in the light guide unit was improved by using a polarization diffraction grating as an optical path conversion unit so that the brightness on the front side and at a polar angle of 45° was further improved than the brightness of Examples 1 and 2.

In the image display device 104 of Example 4, the light guide efficiency in the light guide unit was further improved using a combination of a refractive element and a reflective polarizer as an optical path conversion unit so that the brightness on the front side and a polar angle of 45° was further improved than the brightness of Examples 1 to 3.

In the image display device 105 of Example 5, light beams which had been guided to the light guide unit were refracted on the surface and distributed in an oblique direction by providing a refractive element on the outermost surface thereof so that the brightness at a polar angle of 45° was further improved than the brightness of Example 4.

In the image display device 106 of Example 6, light beams which had been guided to the light guide unit were scattered on the surface and distributed in an oblique direction by providing a light scattering film on the outermost surface thereof so that the brightness at a polar angle of 45° was further improved than the brightness of Example 4. However, blurring of the image was slightly found due to scattering by the light scattering film.

In the image display device 107 of Example 7, the reflection of light beams incident from the viewing side was suppressed by providing a circular polarizer on the outermost surface thereof. Therefore, the image display device 107 had remarkably excellent visibility.

In the image display device 108 of Example 8, the backlight of the liquid crystal display device was condensed. Therefore, the light guide efficiency in the light guide unit was further improved, and the brightness on the front side and at a polar angle of 45° was improved. In the image display device 108, the backlight was condensed using an absorption type louver film, but it is considered that the brightness can be further improved by condensing the backlight according to a method that does not allow absorption of light.

In the image display device 201 of Comparative Example 1, since the optical path conversion unit was not provided, the light guide efficiency in the light guide unit was low and the brightness on the front side and at a polar angle of 45° was low.

In the image display device 202 of Comparative Example 2, the light guide efficiency was improved by increasing the angle between the incident surface and the optical fiber of the fiber optics, but the thickness of the fiber optics was required to be increased in order to narrow the frame.

In the image display device 203 of Comparative Example 3, fiber optics whose thickness was the half the thickness of the fiber optics of the image display device 202 of Comparative Example 2 were used. In this manner, the region where light of the display area was guided was limited, and thus most of the non-display area was not able to be covered. Therefore, the frame was not sufficiently narrowed.

Further, the front brightness of each image display device of Comparative Examples 2 and 3 was smaller than that of the image display device of each example. Therefore, the front brightness was insufficient.

In the image display device 301 of Reference Example 1, the light guide efficiency in the light guide unit was improved by using a beam splitter and reflective fiber optics, and the brightness on the front side and at a polar angle of 45° was further improved than the brightness of Example 1.

According to the technique of the present disclosure, it is possible to provide an image display device which is capable of displaying a high-resolution image and whose frame is narrowed by suppressing an increase in thickness, distortion of an image, color separation, and crosstalk between adjacent pixels accompanied by narrowing the frame. As the image display device, an organic EL display device, an LED display device, an MEMS shutter display device, or another image display device may be used, in addition to the liquid crystal display device. The image display device according to the embodiment of the present invention can be suitably used as all image display devices including televisions, monitors, digital signages, smartphones, car navigation systems, digital cameras, and electronic game machines, and the industrial applicability of the present invention is high.

What is claimed is:

1. An image display device, comprising:
    an image display unit including a display area in which a plurality of pixels is arranged, and a non-display area provided at a periphery of the display area;
    a light guide unit which has one surface disposed so as to face at least an edge of the display area of the image display unit on a viewing side and another surface that is disposed at an opposite side of the light guide from the one surface and is provided at a position shifted further toward the non-display area than the one surface; and
    a diffraction element which is disposed between the image display unit and the light guide unit and diffracts light from the display area toward a side of the non-display area adjacent to the edge.

2. The image display device according to claim 1, wherein the diffraction element is a polarization diffraction grating which includes a liquid crystal layer containing aligned liquid crystal molecules.

3. The image display device according to claim 1, wherein the image display unit emits circularly polarized light.

4. The image display device according to claim 1, further comprising:
    a phase difference plate which is disposed between the image display unit and the diffraction element and converts light emitted from the image display unit into circularly polarized light.

5. The image display device according to claim 1, further comprising:
    a reflective polarizer provided between the image display unit and the light guide unit.

6. The image display device according to claim 1, wherein the light guide unit includes a plurality of light guide areas and a boundary that separates the respective light guide areas.

7. The image display device according to claim 6, wherein;
    the boundary includes a low-refractive index layer, an air layer, a reflective layer, or a dielectric multilayer film, and
    at least some of light beams incident on the light guide areas are guided while repeating total reflection at an interface with the boundary.

8. The image display device according to claim 6, wherein;
    the boundary includes a light absorption layer, and
    at least some of light beams incident on the boundary from the light guide areas are absorbed by the light absorption layer.

9. The image display device according to claim 6, wherein an area of the light guide areas at a side of the other surface is larger than or equal to an area of the light guide areas at a side of the one surface.

10. The image display device according to claim 6, wherein an area of the light guide areas at a side of the one surface is less than or equal to an area of the pixels.

11. The image display device according to claim 1, further comprising a refractive element provided at the other surface of the light guide unit.

12. The image display device according to claim 1, further comprising a light scattering unit provided at the other surface of the light guide unit.

13. The image display device according to claim 1, further comprising:
   a circular polarizer provided at the other surface of the light guide unit.

14. The image display device according to claim 1, wherein the image display unit comprises a liquid crystal display device, an organic electroluminescence display device, a light emitting diode display device, or a microelectromechanical system shutter display device.

* * * * *